(12) United States Patent
Yu et al.

(10) Patent No.: US 7,206,492 B2
(45) Date of Patent: Apr. 17, 2007

(54) LIGHT GUIDE PLATE AND BACKLIGHT MODULE ADOPTING THE SAME

(75) Inventors: Tai-cherng Yu, Tu-Cheng (TW); Charles Leu, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/299,095

(22) Filed: Dec. 9, 2005

(65) Prior Publication Data

US 2006/0127030 A1 Jun. 15, 2006

(30) Foreign Application Priority Data

Dec. 10, 2004 (TW) .............................. 93138254 A

(51) Int. Cl.
*G02B 6/10* (2006.01)
*G02B 5/02* (2006.01)
*G02B 5/04* (2006.01)
*G02B 5/18* (2006.01)

(52) U.S. Cl. ...................... 385/146; 385/147; 385/129; 359/599; 359/707; 359/837

(58) Field of Classification Search ................ 385/122, 385/146, 147; 359/599, 707, 837
See application file for complete search history.

(56) References Cited

U.S. PATENT DOCUMENTS 6,798,574 B2* 9/2004 Kim ........................... 359/566
2002/0048162 A1* 4/2002 Ohkawa et al. ................ 362/31

\* cited by examiner

*Primary Examiner*—Kevin S. Wood
(74) *Attorney, Agent, or Firm*—Morris Manning & Martin LLP; Tim Tingkang Xis, Esq.

(57) ABSTRACT

A light guide plate (120) includes an incidence surfaces (121), an emission surface (123) adjoining the incidence surface, and a bottom surface (122) adjoining the incidence surface and being opposite to the emission surface. The light guide plate further includes a refractive-diffractive hybrid lens array (124) formed on the emission surface. The refractive-diffractive hybrid lens array has a plurality of refractive-diffractive hybrid lenses (125). The refractive-diffractive hybrid lenses can reduce or even avoid chromatic aberration along axes thereof. This can converge emitted light beams, thereby enhancing a brightness of the emitted light beams. Thus, the light guide plate can provide good display quality. Therefore, the light guide plate can be advantageously applied in backlight modules (210) of liquid crystal display devices.

14 Claims, 2 Drawing Sheets

US 7,206,492 B2

LIGHT GUIDE PLATE AND BACKLIGHT MODULE ADOPTING THE SAME

RELATED APPLICATION

This application is related to commonly-assigned applications entitled, "A PRISM SHEET AND A BACKLIGHT MODULE ADOPTING THE SAME", filed on Nov. 18, 2005 with application Ser. No. 11/283,467.

BACKGROUND

1. Field of the Invention

The invention relates generally to light guide plates and backlight modules adopting the same, and more particularly to a light guide plate typically used in liquid crystal display devices and a backlight module adopting the same.

2. Related Art

Liquid crystal display (LCD) devices have many excellent performance features, such as large-scale information display capability, low power consumption, easy coloring, long life, environmental soundness, and so on. Therefore, liquid crystal display devices are widely used in numerous applications. A typical liquid crystal display device generally includes a backlight module. The backlight module is used to convert linear light sources such as cold cathode ray tubes, or point light sources such as light emitting diodes, into area light sources having high uniformity and brightness.

Referring to FIG. 4, a conventional backlight module 10 includes a light guide plate 20, a reflector 30, a light source 40, and a cover 50. The light guide plate 20 includes an incidence surface 21, an emission surface 23 adjoining the incidence surface 21, and a bottom surface 22 adjoining the incidence surface 21 and being opposite to the emission surface 23. A plurality of refractive lenses 24 are formed on the emission surface 23, and each refractive lens 24 is a hemispherical dot. The reflector 30 is located below the bottom surface 22 of the light guide plate 20. Rear, top and bottom portions of the light source 40 are covered by the cover 50, which is positioned beside the incidence surface 21 of the light guide plate 20.

In use, incident light beams are emitted from the light source 40 and propagate into the light guide plate 20 via the incidence surface 21. The light guide plate 20 ensures that most of the light beams traveling therein can be emitted from the emission surface 23 thereof. The reflector 30 is used to reflect at least some and, preferably, nearly all of the light beams that are emitted from the bottom surface 22 back into the light guide plate 20. This reflection enhances the utilization ratio of the light beams.

However, light with a relatively long wavelength has a relatively small refraction angle, and is focused at a relatively far point when it travels through the refractive lenses 24. On the other hand, light with a relatively short wavelength has a relatively large refraction angle and is focused at a relatively near point when it travels through the refractive lenses 24. That is, the focus of blue light, the focus of green light and the focus of red light traveling through each refractive lens 24 are sequentially located on an axis of the refractive lens 24. Therefore, the emitted light beams generally cannot be converged via the refractive lenses 24. This causes chromatic aberration and reduces a brightness of the emitted light beams. Thus, the light guide plate 20 frequently cannot provide a satisfactory display quality.

What is needed, therefore, is a light guide plate that can provide emitted light beams with high brightness.

What is also needed is a backlight module adopting the above-mentioned light guide plate.

SUMMARY

In one embodiment, a light guide plate includes an incidence surfaces, an emission surface adjoining the incidence surface, and a bottom surface adjoining the incidence surface and being opposite to the emission surface. The light guide plate further includes a refractive-diffractive hybrid lens array formed on the emission surface. The refractive-diffractive hybrid lens array has a plurality of refractive-diffractive hybrid lenses. Each refractive-diffractive hybrid lens is a concentric stepped cylindrical dot.

In another embodiment, a backlight module includes the above-described light guide plate, a light source, a cover and a reflector. Rear, top and bottom portions of the light source are covered by the cover, which is positioned beside the incidence surface of the light guide plate. The reflector is positioned below the bottom surface of the light guide plate. Light beams emitted from the light source are transmitted to the incidence surface of the light guide plate and are emitted from the emission surface of the light guide plate via the refractive-diffractive hybrid lenses.

Compared with a conventional light guide plate, the refractive-diffractive hybrid lenses of the present light guide plate can reduce or even avoid chromatic aberration along axes thereof. This can converge emitted light beams, thereby enhancing a brightness of the emitted light beams. Thus, the light guide plate can provide good display quality. Therefore, the present backlight module adopting the present light guide plate can be advantageously applied in liquid crystal display devices.

Other advantages and novel features of the present light guide plate and the backlight module adopting the same will become more apparent from the following detailed description of preferred embodiments thereof when taken in conjunction with the accompanying drawings.

BRIEF DESCRIPTION OF THE DRAWINGS

Many aspects of the present light guide plate and the backlight module adopting the same can be better understood with reference to the following drawings. The components in the drawings are not necessarily to scale, the emphasis instead being placed upon clearly illustrating the principles of the present light guide plate and the backlight module adopting the same. Moreover, in the drawings, like reference numerals designate corresponding parts throughout the several views.

Corresponding reference characters indicate corresponding parts throughout the several views. The exemplifications set out herein illustrate at least one preferred embodiment of the present light guide plate and the backlight module adopting the same, in one form, and such exemplifications are not to be construed as limiting the scope of the invention in any manner.

DETAILED DESCRIPTION OF PREFERRED EMBODIMENTS

Reference will now be made to the drawings to describe embodiments of the present light guide plate in detail.

Figure 1:
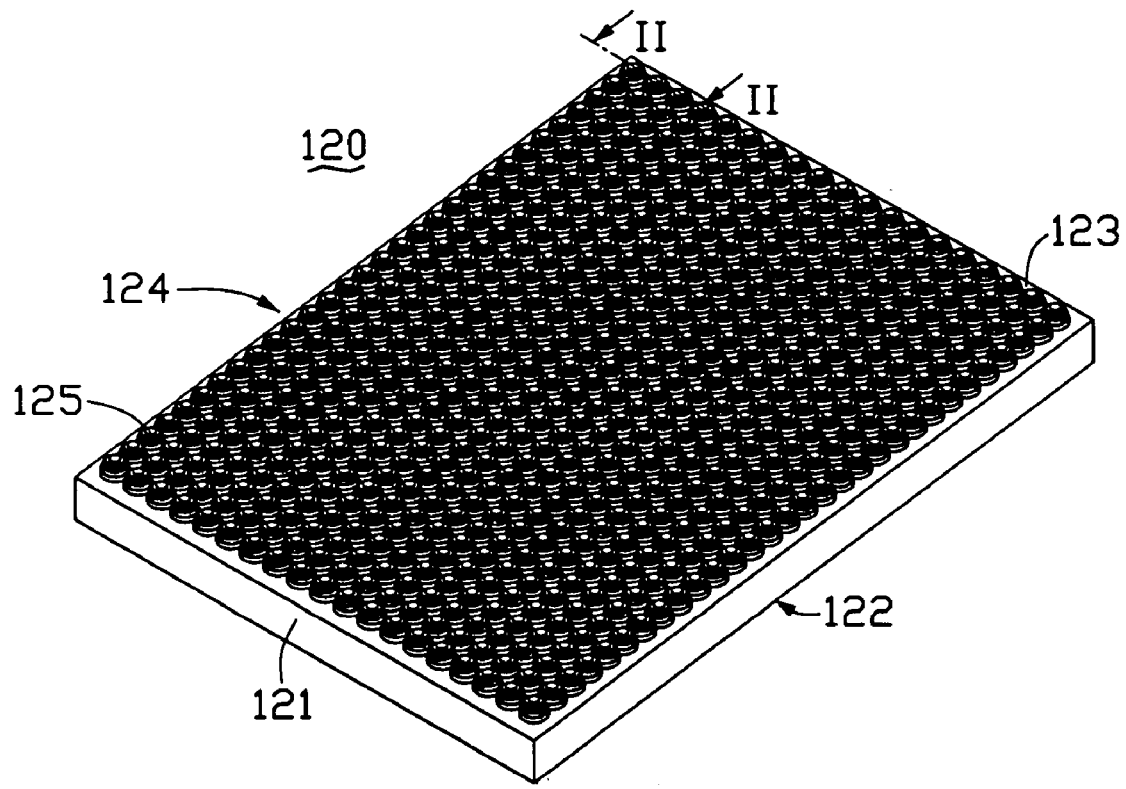
FIG. 1 is an isometric view of a light guide plate in accordance with a preferred embodiment of the present invention.

Referring to FIG. 1, a plate-like light guide member 120 in accordance with a preferred embodiment includes an incidence surface 121, an emission surface 123 adjoining the incidence surface 121, and a bottom surface 122 adjoining the incidence surface 121 and being opposite to the emission surface 123. The light guide plate 120 further includes a refractive-diffractive hybrid lens array 124 formed on the emission surface 123. The refractive-diffractive hybrid lens array 124 has a plurality of refractive-diffractive hybrid lenses 125 arranged in multiple rows and multiple columns.

Figure 2:
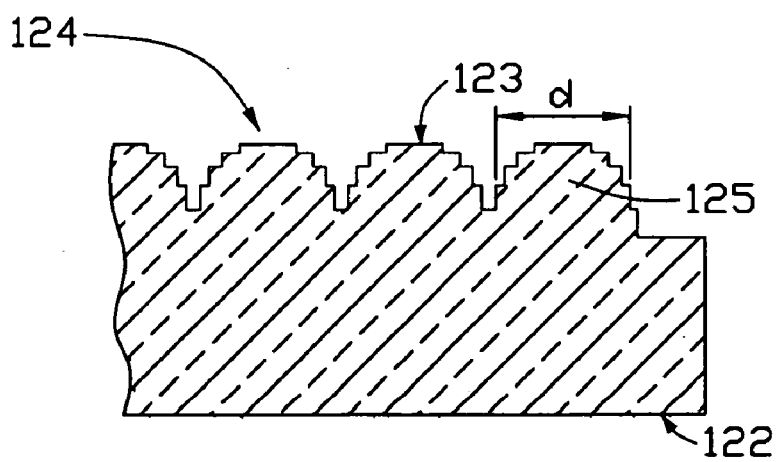
FIG. 2 is a cross-sectional view taken along line II—II of FIG. 1.

FIG. 2 is an enlarged, cross-sectional view of part of the light guide plate 120. As shown in FIG. 2, each refractive-diffractive hybrid lens 125 is a concentric stepped cylindrical dot, and is a combination of a refractive lens and a diffractive lens. A maximum diameter d of each refractive-diffractive hybrid lens 125 is in the range from 1 micrometer to several millimeters. For example, the maximum diameter d would not normally be expected to exceed nine millimeters.

Light with a relatively long wavelength has a relatively small refraction angle and is focused at a relatively far point when it travels through a refractive lens. On the other hand, light with a relatively short wavelength has a relatively large refraction angle and is focused at a relatively near point when it travels through the refractive lens. That is, the focus of blue light, the focus of green light and the focus of red light traveling through each refractive lens are sequentially located on an axis of the refractive lens. This results in chromatic aberration. Furthermore, light with a relatively long wavelength has a relatively large diffraction angle and is focused at a relatively near point when it travels through a diffractive lens. On the other hand, light with a relatively short wavelength has a relatively small diffraction angle and is focused at a relatively far point when it travels through the diffractive lens. That is, the focus of red light, the focus of green light and the focus of blue light traveling through each diffractive lens are sequentially located on an axis of the diffractive lens. This results in inverse chromatic aberration.

Therefore, when light beams comprising light with relatively long wavelengths and light with the relatively short wavelengths are transmitted through the refractive-diffractive hybrid lens 125, the above-described two kinds of chromatic aberration can be counteracted. This can converge the light beams, thereby enhancing a brightness of the light beam. The convergence effect can be controlled by adjusting the step number of each refractive-diffractive hybrid lens 125.

Figure 3:
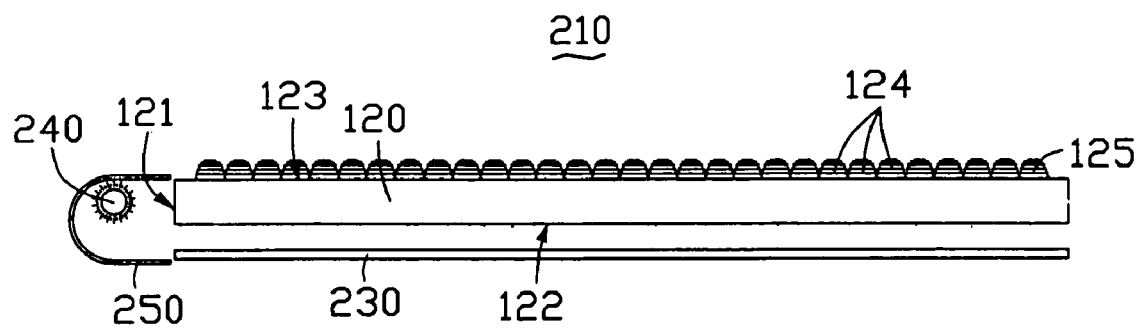
FIG. 3 is a schematic, side view of a backlight module in accordance with a preferred embodiment of the present invention, the backlight module including the light guide plate of FIG. 1.
Figure 4:
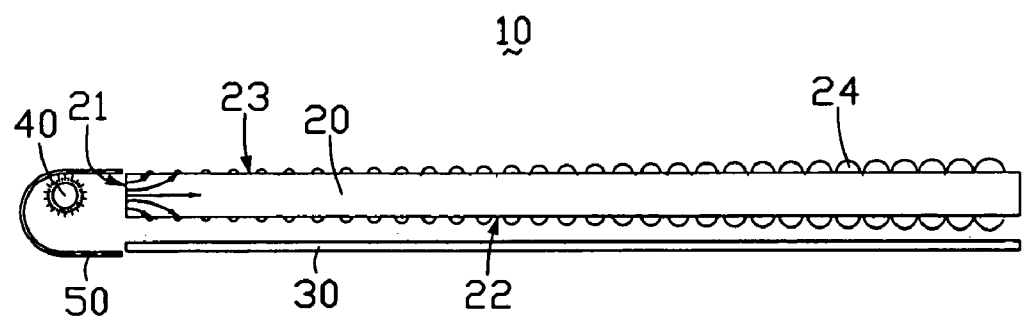
FIG. 4 is a schematic, side view of a conventional backlight module.

Referring to FIG. 3, a backlight module 210 of a display device in accordance with another preferred embodiment is shown. The backlight module 210 adopts the above-described light guide plate 120, and further includes a light source 240, a cover 250 and a reflector 230. Rear, top and bottom portions of the light source 240 are covered by the cover 250, which is positioned beside the incidence surface 121 of the light guide plate 120. The reflector 230 is positioned below the bottom surface 122 of the light guide plate 120.

In use, incident light beams are emitted from the light source 240 and are transmitted into the light guide plate 20 via the incidence surface 121. The light guide plate 120 ensures that most of the light beams traveling and reflected therein can be emitted from the emission surface 123 thereof. The reflector 230 is used to reflect some of the light beams emitted from the bottom surface 122 back into the light guide plate 20. This reflection enhances the utilization ratio of the light beams. The light beams emitted from the emission surface 123 of the light guide plate 20 transmit through the refractive-diffractive hybrid lenses 125 and are converged by the refractive-diffractive hybrid lenses 125. This enhances a brightness of the emitted light beams. Therefore, the backlight module 210 adopting the light guide plate 120 can provide good display quality and can be advantageously applied in liquid crystal display devices.

Finally, it is to be understood that the above-described embodiments are intended to illustrate rather than limit the invention. Variations may be made to the embodiments without departing from the spirit of the invention as claimed. The embodiments illustrate the invention but do not restrict the scope of the invention.

We claim:

1. A backlight module comprising:
    a light guide plate comprising:
    at least an incidence surface;
    an emission surface;
    a bottom surface opposite to the emission surface; and
    a plurality of refractive-diffractive hybrid lenses provided at the emission surface;
    at least a light source positioned beside the incidence surface of the light guide plate; and
    a reflector positioned below the bottom surface of the light guide plate;
    wherein each refractive-diffractive hybrid lens is a concentric stepped cylindrical dot.

2. The backlight module as claimed in claim 1, wherein the refractive-diffractive hybrid lenses are formed on the emission surface of the light guide plate in multiple rows and multiple columns.

3. The backlight module as claimed in claim 1, wherein each refractive-diffractive hybrid lens is a combination of a refractive lens and a diffractive lens.

4. The backlight module as claimed in claim 1, wherein a maximum diameter of each dot is in the range from 1 micrometer to nine millimeters.

5. The backlight module as claimed in claim 1, wherein the emission surface of the light guide plate adjoins the incidence surface thereof.

6. The backlight module as claimed in claim 1, wherein the bottom surface of the light guide plate adjoins the incidence surface thereof.

7. The backlight module as claimed in claim 1, further comprising a cover, wherein rear, top and bottom portions of the light source are covered by the cover.

8. A backlight module comprising:
    a light source for emitting light; and
    a light guide member disposed beside said light source so as to accept said light from said light source into said light guide member via an incidence surface thereof and to release said light out of said light guide member via an emission surface thereof, a plurality of refractive-diffractive hybrid lenses formed at said emission surface so as to transform said light before release of said light out of said light guide member;
    wherein each refractive-diffractive hybrid lens is a concentric stepped cylindrical dot.

9. The backlight module as claimed in claim 8, wherein the refractive-diffractive hybrid lenses are formed on said emission surface of said light guide member in multiple rows and multiple columns.

10. The backlight module as claimed in claim 8, wherein each refractive-diffractive hybrid lens is a combination of a refractive lens and a diffractive lens.

11. The backlight module as claimed in claim 8, wherein a maximum diameter of each dot is in the range from 1 micrometer to nine millimeters.

12. The backlight module as claimed in claim 8, wherein said emission surface of said light guide member adjoins said incidence surface thereof.

13. The backlight module as claimed in claim 8, wherein said light guide member further comprises a bottom surface opposite to said emission surface.

14. The backlight module as claimed in claim 13, wherein said bottom surface of said light guide member adjoins said incidence surface thereof.

* * * * *